(12) United States Patent
Park (10) Patent No.: US 6,901,583 B1
(45) Date of Patent: May 31, 2005

(54) METHOD FOR TESTING OF A SOFTWARE EMULATOR WHILE EXECUTING THE SOFTWARE EMULATOR ON A TARGET MACHINE ARCHITECTURE

(75) Inventor: Collin Y. Park, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 852 days.

(21) Appl. No.: 09/909,057

(22) Filed: Jul. 19, 2001

(51) Int. Cl.[7] .............................. G06F 9/44; G06F 9/45; G06F 9/455
(52) U.S. Cl. ........................ 717/134; 717/138; 703/26
(58) Field of Search ................................ 717/124–135, 717/138; 703/23–28

(56) References Cited

U.S. PATENT DOCUMENTS

| | | | | |
|---|---|---|---|---|
| 5,790,778 A | * | 8/1998 | Bush et al. | .................... 714/38 |
| 6,141,635 A | * | 10/2000 | Paul et al. | ..................... 703/22 |
| 6,223,272 B1 | * | 4/2001 | Coehlo et al. | ................. 712/1 |
| 6,415,436 B1 | * | 7/2002 | Patel | .......................... 717/140 |
| 2002/0184613 A1 | * | 12/2002 | Kuzemchak et al. | ........ 717/126 |

* cited by examiner

*Primary Examiner*—Anil Khatri
*Assistant Examiner*—Trent J Roche (57) ABSTRACT

A method and a apparatus for testing a software emulator while executing the software emulator on a target machine architecture are disclosed. The method may include the steps of executing a test program on a target machine architecture, with a test program producing a first output, executing an emulator on the target machine architecture, and the emulator executing the test program under emulation, with the test program producing a second output.

20 Claims, 5 Drawing Sheets

Fig. 5

METHOD FOR TESTING OF A SOFTWARE EMULATOR WHILE EXECUTING THE SOFTWARE EMULATOR ON A TARGET MACHINE ARCHITECTURE

BACKGROUND OF THE INVENTION

1. Technical Field

The present invention relates to software emulators and, more particularly, relates to testing of software emulators.

2. Description of Related Art

An emulator is generally a device that is built to work like another. An emulator can be hardware, software, or a combination thereof. For example, an emulator may be software running on one machine that is designed to emulate another type of computer. Likewise, an emulator may be designed to execute software that was written to run on another computer. Typically, one computer emulates another computer (i.e., a computer with a different instruction set architecture (ISA)). A computer's normal running mode, called native mode, is the operational state of the computer when the computer is executing programs from the computer's built-in instruction set (host machine "architecture"). In contrast, an emulation mode is the operational state of the computer while the computer is running a foreign program under emulation (using a "target machine architecture"). A foreign program is a program written in a different (foreign) ISA (i.e., the target ISA) than the host machine's ISA (i.e., the host ISA).

When an emulator is built, it is often necessary to test the emulator to determine the emulator's effectiveness. Typical and obvious methods of testing emulators have involved such strategies as: 1) forcing an emulated machine into a known state, executing a test program under emulation, and comparing a finished state vector in the emulator against a hand generated expected state vector; 2) forcing an emulated machine into a known state, executing a state program under emulation, and comparing the emulations finished state vector against the finished state vector of a previous version of the emulator (i.e., "known good" finish state vector)—in a practice commonly known as "regression testing"; 3) forcing an emulated machine to a known state, executing a test program under emulation, and comparing the finished state vector against the finished state vector of the program as run on the target machine architecture; and, 4) forcing an emulated machine into a known state, executing a random sequence of machine instructions under emulation, and comparing the emulator's finished state vector against the finished state vector of the same sequence as run on the target machine architecture.

Figure 1:
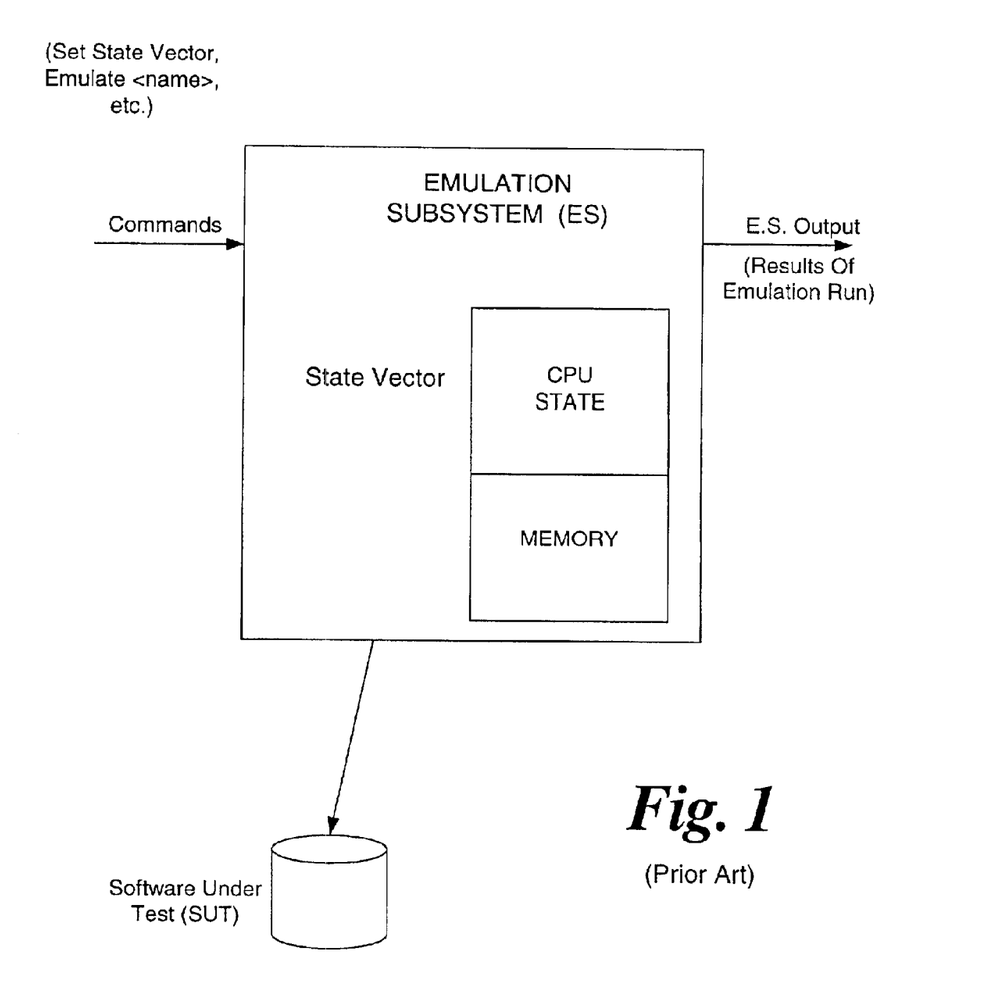
FIG. 1 is a prior art diagram illustrating conventional emulation testing methods.

The above approaches of testing emulators all require the test program to be run under emulation and the output of the emulation to be compared with something else—a hand generated prediction, output of another emulation run, etc. FIG. 1 is a diagram generally illustrating the above approaches to testing emulators. Among the disadvantages of the above approaches is the likelihood of clerical error. For example, when comparing the output of one emulation run against another emulation run one output file may easily be confused with another. Likewise, hand-generated predictions of the output state are subject to transcription errors. Furthermore, in certain non-Unix operating systems such as Multi-Programming Executive ("MPE"), the state vector may contain important information, which, unfortunately, varies from one execution to another. Such variation makes simple-minded comparisons of state vectors difficult. MPE is a multi-user operating system (OS) developed by Hewlett-Packard Company in the 1970's. The current version of MPE is POSIX compliant and supports UNIX function calls.

What is needed, therefore, is a method of testing emulators that does not involve such complex and error-prone state vector setup and such complexity and susceptibility to errors in the checking of results.

BRIEF SUMMARY OF THE INVENTION

The objects, features and advantages of the present invention are readily apparent from the detailed description of the preferred embodiments set forth below, in conjunction with the accompanying Drawings in which:

The present invention is a method and system that overcomes the above problems by executing a test program on a target machine architecture, executing the test program under emulation on the same target machine architecture, and comparing the results of the two program executions to evaluate the emulator. One such situation where it is desirable to test an emulator is when a developer is developing a new ISA and a new Operating System (OS) for the new ISA. In current technology, programs written in a so-called high-level language (e.g., C++, Java) can be "compiled" into multiple ISAs and can be confidently asserted to have substantially the same behavior. Therefore, when the developer is developing an OS for a new ISA, the developer can develop an emulator portion (written in a high-level language) of the new OS for the new ISA, compile the emulator in the old ISA and test the emulator on the old ISA (using the old ISA as the host ISA and the target ISA).

For example, if the old ISA is "PA-RISC" and the new ISA is "XYZ", the developer could build an emulator for XYZ in a high-level language, compile the emulator in PA-RISC, and run the emulator on the PA-RISC itself (i.e., PA-RISC is the host ISA). This procedure catches the majority of errors in the emulator and minimizes the number of errors upon re-compiling and executing the emulator in XYZ since the compiled program (the emulator) can be confidently asserted to have substantially the same behavior under PA-RISC as under XYZ. If the new ISA (e.g., XYZ) is not built yet, then testing the emulator on the old ISA (e.g., PA-RISC) can expedite the overall development process.

Another advantage of the present invention is that the present invention overcomes the disadvantages of the prior art. Another advantage of the present invention is that the present invention avoids susceptibility to errors present in prior methods of testing emulators. Another advantage of the present invention is that where an emulator is trying to emulate a target machine ISA, the method permits a test program to be run directly on the target machine ISA and also under emulation (on the same target machine ISA) within a single machine process (i.e., the host machine ISA is the same as the target machine ISA). This advantage leads to another advantage of the present invention in that the present invention avoids the variation in state vectors that is a problem with the prior art methods of testing emulators.

These and other advantages of the present invention are achieved in a method for testing a software emulator while executing the software emulator on a target machine architecture, comprising the steps of executing a test program on a target machine architecture, executing an emulator on the target machine architecture, and the emulator executing the test program under emulation. Executing the test program produces a first output and the emulator executing the test program produces a second output.

These and other advantages of the present invention are also achieved in a computer readable medium comprising instructions for testing a software emulator while executing the software emulator on a target machine architecture, by executing a test program on a target machine architecture, whereby the test program produces a first output, executing an emulator on the target machine architecture, and the emulator executing the test program under emulation, whereby the test program produces a second output.

These and other advantages of the present invention are also achieved in a computer readable medium containing a program that includes instructions for testing a software emulator while executing the software emulator on a target machine architecture, by executing a test program on a target machine architecture, whereby the test program produces a first output and executing an emulator on target machine architecture. The emulator calls the test program and executes the test program under emulation, whereby the test program produces a second output.

BRIEF DESCRIPTION OF THE DRAWINGS

The invention will be described, by way of example, in the description of exemplary embodiments, with particular reference to the accompanying drawings, in which like reference numbers refer to like elements, and in which.

DETAILED DESCRIPTION OF THE INVENTION

In a preferred embodiment of the present invention, a single test program produces all the output necessary for testing an emulator and therefore various clerical errors present in the prior art are rendered irrelevant. In a preferred scenario of usage, a test program (possibly a random sequence of machine instructions) is embodied in a subprogram or subroutine. The main program performs a subprogram or subroutine call to execute the test program directly on a target machine architecture. When the test program is finished executing, the main program then causes the test program to execute under emulation. Since both the emulated execution and a direct execution of the test program execute within the same process, certain kinds of process-to-process variations do not occur, and the comparison described above is reduced to a comparison between the "first half" and the "second half" of the single program's output. Executing the test program directly and under emulation within the same process simplifies the clerical aspect of testing by removing several sources of error.

A preferred embodiment of the present invention includes components, such as an emulator, which executes on a target machine architecture, in the form of a callable library, for example. The emulator preferably includes a callable entry point having semantics "begin emulation at the return point of this subroutine." Such an entry point, when invoked, preferably copies the host machine's state vector into the emulated machine's state vector, and emulates instructions starting at a point where the invoking program (the main program) would have returned (i.e., the next instruction in the main program). Another component of the preferred embodiment is a subprogram to be tested (a "test program"), which will be executed directly upon the target architecture and also under emulation (using the same target machine architecture). The effects of the subprogram are preferably visible in a standard output or default print output stream. Another component of the preferred embodiment is preferably a main program that may be coded as follows:

1001 CALL sut
1002 CALL es
1003 CALL sut
1004 MOV %arg0,#0
1005 CALL _exit, where "CALL" does a subroutine call, "MOV" causes a register to be set to a certain value (the "arg0" register set to zero in this case), "sut" is an address of an entry point of the subroutine under test (the test program), "es" is an address of an emulation subsystem's (the emulator's) entry point, and "_exit" is an address of a supervisor call to terminate execution.

In the above situation, the host machine executes the first "CALL sut", then executes the instructions in the test program. The last instruction of the test program executed is typically a "RETURN" type of instruction, which basically means "resume execution at the point (in the main program) after the CALL instruction that started the test program."

Then the host machine executes the "CALL es" instruction, and then starts executing the emulator. The emulator determines that the emulator was called from the address "1002". The emulator then determines that the next instruction to emulate is at 1003, and the emulator's very first "next instruction" is the 2nd "CALL sut" instruction at "1003" above. The subsequent instruction is the first instruction of the test program.

Again, the very first "next instruction" is the "CALL sut" (if there is additional setup, it would include that setup as well)—the next instruction after that would be the first instruction of the subroutine under test.

The preferred embodiment may also include a further component such as an automated comparison subroutine that compares the first output produced by the first execution of the test program to a second output produced by the second execution of the test program (the execution of the test program under emulation).

Figure 2:
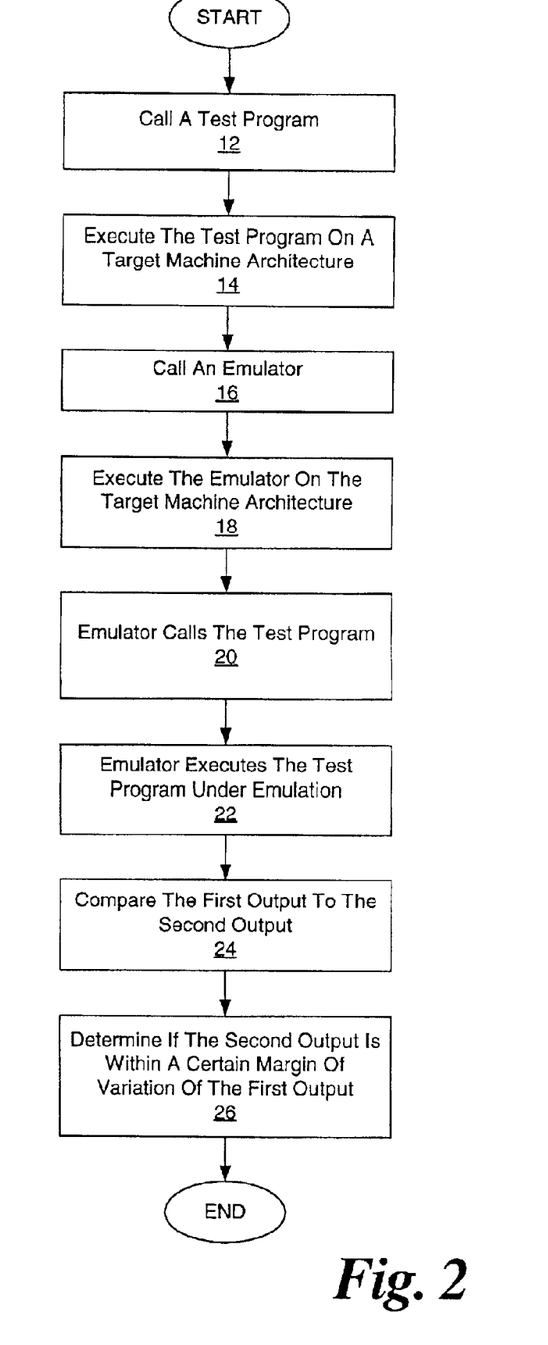
FIG. 2 is a flowchart illustrating an embodiment of a method for testing emulators while executing the emulator on a target machine architecture.

FIG. 2 is a flowchart illustrating a method 10 for testing the software emulator while executing the software emulator on a target machine architecture. The method 10 preferably comprises: calling a test program 12; executing a test program on a target machine architecture 14; calling an emulator 16; executing the emulator on the target machine architecture 18; the emulator calling the test program 20; the emulator executing the test program under emulation 22; comparing a first output produced by the executed test program to a second output produced by the test program executed under emulation 24; and, determining if the second output is within a certain margin of variation from the first output 26.

Calling a test program 12 preferably comprises the main program executing a native call of the test program. Calling a test program 12, therefore, triggers the executing of the test program 14, in a native mode, on the target machine architecture. In this situation, the target machine architecture is a basic set of instructions for machine language with which a host machine running a main program is coded.

Executing the test program of a target machine architecture 14 preferably comprises the test program executing the test program instructions until the test program reaches an end of program. The executed test program instructions preferably produce at least one output ("a first output"). The test program instructions may produce a plurality of outputs when executed (i.e., the first output is the plurality of outputs). When the test program reaches a "RETURN", a native return is executed returning control to the main program.

Calling an emulator 16 preferably comprises the main program calling the emulator. The calling of the emulator 16 is preferably executed as a native call. Calling the emulator 16 triggers executing the emulator on the target machine architecture 18. Executing the emulator on the target machine architecture 18 preferably comprises the emulator setting up a state vector and then executing the next instruction(s) of the main program. The emulator, therefore, performs an emulated return to the main program to execute the next instruction of the main program. The next instruction on the main program may include setup instructions such as printing a "begin emulation mode" message. The emulator executes such setup instructions and then executes the next main program instruction, which preferably calls the test program. Therefore, the emulator calling the test program 20 preferably comprises the emulator executing a main program instruction to affect an emulated call of the test program. As described above, the instruction set architecture of the emulator is the same as the host machine instruction set architecture. The emulator calling the test program 20 triggers the emulator executing the test program under emulation 22.

The emulator executing the program under emulation 22 preferably comprises the emulator executing each instruction of the test program in sequence until a "RETURN" or other end of program is reached. As noted previously, the test program preferably includes an instruction that produces at least one output. When the emulator executes the test program, the execution under emulation preferably produces a "second output". The second output may include a plurality of outputs, as above. When the test program reaches the "RETURN", an emulated return is preferably performed to return control to the main program. The emulator then executes the next instruction of the main program.

Comparing the first output to the second output 24 preferably comprises an automatic or automated comparison of the first output produced during the first execution of the test program to the second output produced by the execution of the test program under emulation. The automated comparison may be encoded in the main program or separately as a subroutine or program. Determining if the second output is within a certain margin of variation of the first output 26 preferably comprises the automated subroutine program calculating the difference between the first output and the second output and determining whether the difference is within a pre-set margin of variation. If the difference is within the pre-set margin of variation, then the emulator is performing satisfactorily. The method 10 of testing may be repeated as necessary to produce a sufficient sample of results. Likewise, the method 10 may be repeated after changes/corrections are made to the emulator and the emulator is re-compiled in the target ISA (the host ISA).

Figure 3:
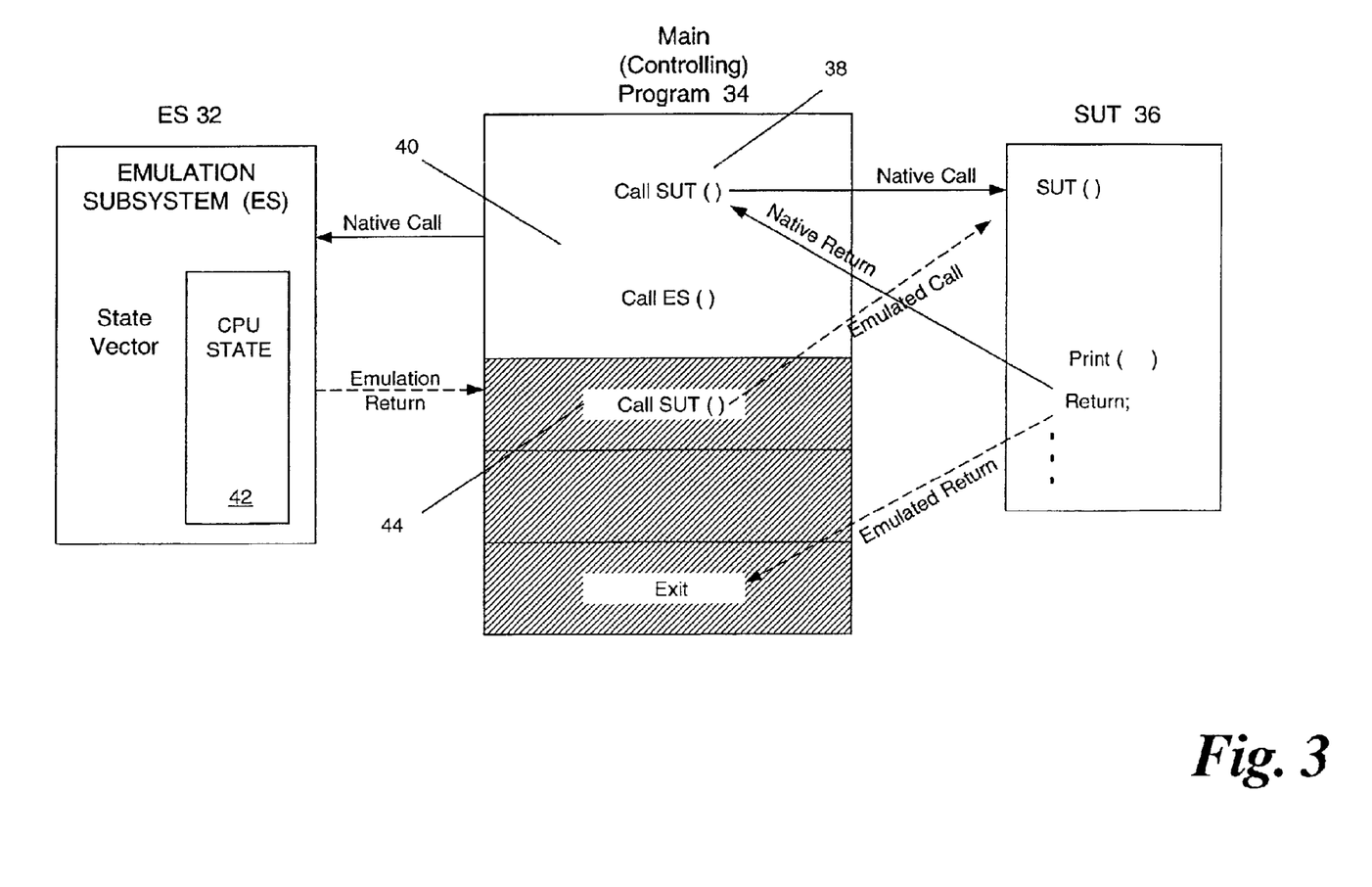
FIG. 3 is a block/flow diagram illustrating an embodiment of a system method for testing of a software emulator while executing the software on a target machine architecture.

FIG. 3 is a block-flow diagram illustrating an emulator 32, main program 34, and a test program 36. The solid arrows in FIG. 3 represent native transfers of control while the dashed arrows represent emulated transfers of control. The main program 34 preferably comprises a series of instructions as described above. The instructions of the main program preferably comprise a test program call 38 that executes a native call of the test program 36. The test program 36 preferably comprises a series of instructions, as described above. The test program 36 instructions preferably produce an output(s). The test program 36 preferably executes a native return to the main program 34 when the test program reaches a "RETURN" or other end of program information. The main program 34 preferably also includes a call emulator instruction 40 that preferably executes a native call of the emulator 32. The emulator 32 preferably includes a state vector 42 that is loaded with the state of a central processing unit ("CPU") on which the main program 34, test program 36, and emulator 32 execute. The main program 34 includes a portion, shown with cross-hatching in FIG. 3, that represents an emulated execution. The emulated portion includes a second test program call instruction 44 that is executed by the emulator 32 to perform an emulated call of the test program 36. After the test program 36 executes under emulation and performs an emulated return to the main program 34, the emulator 32 executes a RETURN instruction. As shown in FIG. 3, the emulator 32 does not have a separate "memory" portion of its state vector 42, rather, the emulator 32 simply uses a native memory of the CPU. A comparison subroutine or program is not shown in FIG. 3.

Figure 4:
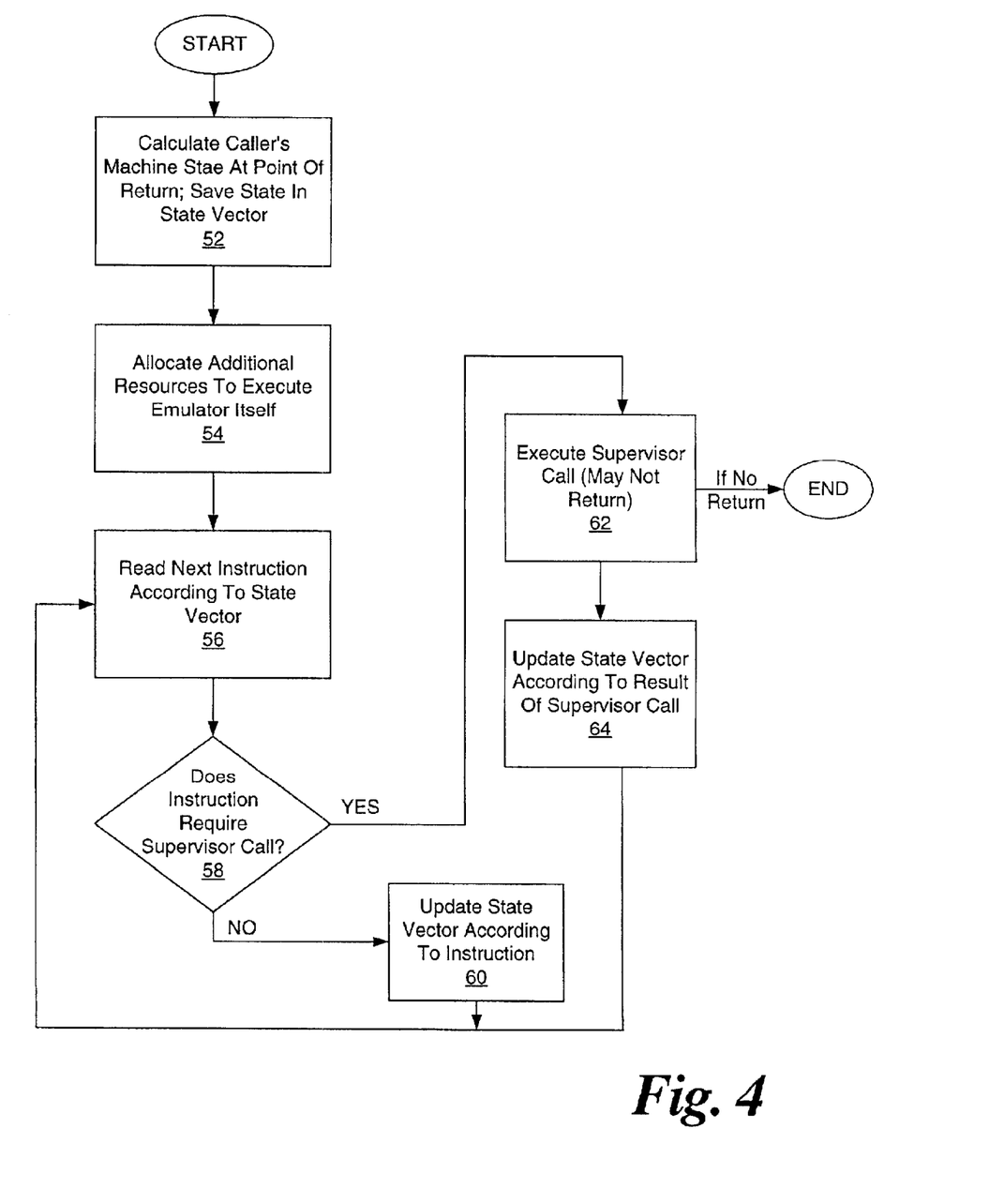
FIG. 4 is a flow chart illustrating steps of emulator execution testing in detail.

FIG. 4 is a flow diagram illustrating steps 18 through 22 of the method 10 in greater detail. A method 50 of emulator execution and testing shown in FIG. 4 comprises: calculating and saving the target machine's state at the point of return 52; allocating additional resources to execute the emulator 54; reading the next instruction according to the state vector 56; determining whether the next instruction requires a supervisor call 58; if a supervisor call is not required, updating the state vector according to the next instruction 60; if a supervisor call is required, executing the supervisor call 62 and updating the state vector according to the result of a supervisor call 64. As shown in FIG. 4, the method 50 will repeat until a supervisor call that does not return (e.g., an "_exit" supervisor call) is executed. When an "_exit" supervisor call is executed, the process (including the emulator) terminates as a normal native program would.

Calculating and saving the target machine's state at the point of return 52 preferably comprises the emulator 32 determining the instructions of the main program following the point at which the emulator 32 was called by the main program and loading these instructions into the state vector in the emulator 32. When the emulator 32 is called, the call typically causes certain parts of the host machine CPU's state to be saved in a memory "stack". A subroutine needs to know where this information is saved (i.e., to the extent necessary to execute the "return from subroutine" instruction). The emulator 32, itself coded as a subroutine, must thus know where this information is stored. The emulator 32 is preferably programmed to assign the address of the first instruction in the main program that will be executed when the emulator 32 returns to the main program to a variable (e.g., the "return address"). The emulator 32 can then read the contents of the instruction memory using the return address to load the first instruction into a variable in order to emulate the first instruction.

As described above, when a subroutine (of which the emulator is one) is called, the return address is typically written into (or "pushed onto") the stack. When the subroutine returns to its caller, the return address is read from (or "popped off") the stack. The subroutine may also allocate local variables (temporary storage) on the stack. When the subroutine returns to its caller, the local variables are deleted from the stack. There may also be a "heap" from which memory may be allocated in a less transient manner. A subroutine may, for example, allocate a block of memory from the heap, write a pointer to that block into a global variable, and return. Whereas the subroutine's local variables all are deleted when the subroutine returns, the memory allocated from the heap remains.

The emulator 32, being itself a subroutine that may also call other subroutines, typically uses the stack and the heap in the manner described above. That the emulator 32 preferably never actually returns to the main program does not detract from the fact that in an emulated return to the main program, the resources allocated by the emulator 32 must be, in the emulated machine, returned for use by the emulated program.

A program being emulated (e.g., the test program) will typically also make use of the stack and the heap. Therefore, unless precautions are taken, the emulator's use of the stack and the heap may conflict with the test program's use of the stack or the heap. Therefore, allocating additional resources to execute the emulator 54 preferably comprises the emulator 32 allocating a separate stack and/or heap for its own use. Certain architectures may also require additional resources.

Reading the next instruction according to the state vector 56 preferably comprises the emulator reading out the next stored instruction in the state vector. When the emulator is first called, the next instruction is the next instruction of the main program. If the next instruction of the main program calls the test program, the subsequent instruction will be the first instruction of the test program.

In the determining step 58, the emulator 32 determines if the next instruction of the main program requires a supervisor call. A supervisor call is a mechanism used by an application program to request service from the operating system. System calls often use a special machine code instruction that causes the host machine CPU to change mode (e.g., to a supervisor mode). The supervisor mode allows the host machine operating system to perform restricted actions such as accessing hardware devices or a memory management unit. If an instruction requiring a supervisor call is encountered, i.e., if the emulator 32 cannot execute the instruction because the emulator is not designed to emulate the restricted actions, then the emulator 32 will perform a supervisor call 62 on behalf of the emulated program.

If the next instruction does not require a supervisor call, updating the state vector according to the next instruction 60 preferably comprises the emulator 32 executing the present instruction and returning to read the next instruction after the present instruction (i.e., the emulator 32 repeats step 56 for the next instruction after the present instruction and so on until an _exit supervisor call is reached). If the next instruction is the first instruction of the test program (i.e., the test program is called by the previous instruction) the emulator 32 proceeds to execute the instructions of the test program until a "RETURN" instruction in the test program is reached. The "RETURN" instruction returns control to the main program, causing the emulator 32 to resume execution at an instruction after the call test program instruction. The emulator 32 proceeds to execute remaining instructions of the main program (including, for example, a comparison subroutine) until it reaches an "_exit" supervisor call in the main program. When the emulator 32 reaches the "_exit" supervisor call, the emulator executes the supervisor call 62 necessary to exit the main program and the main program is exited.

Figure 5:
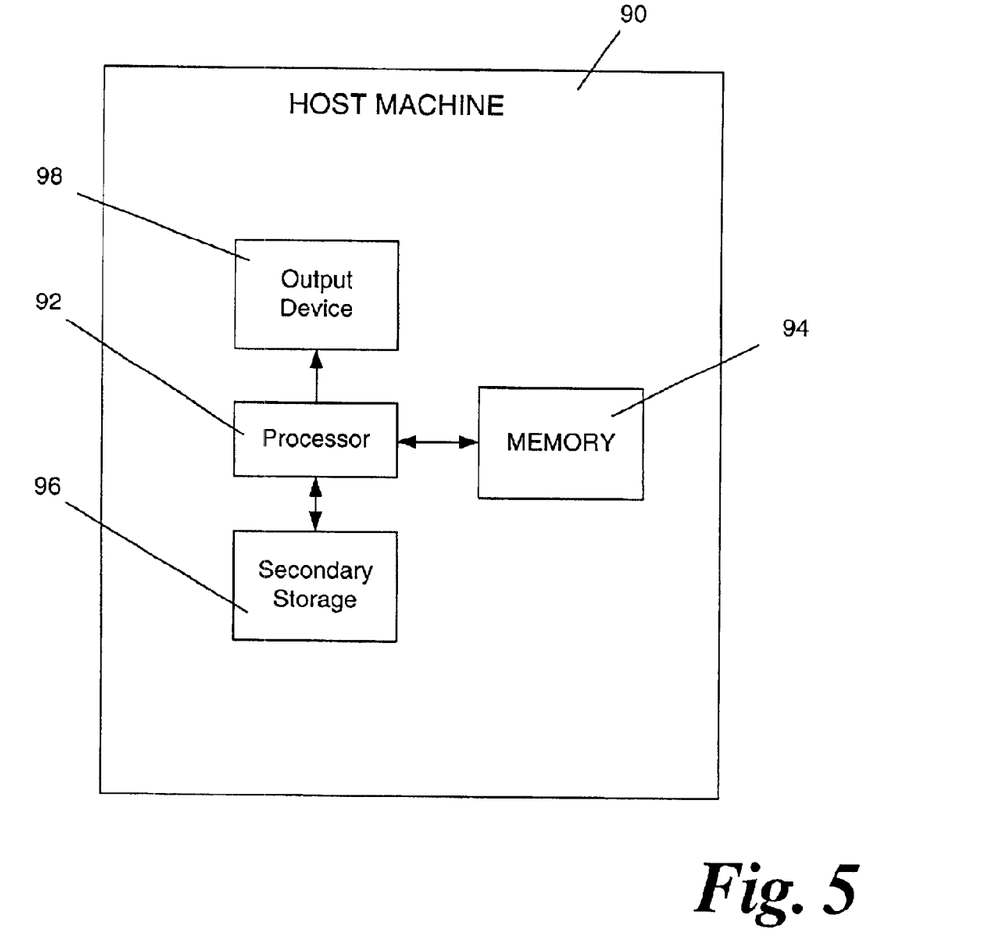
FIG. 5 is a block diagram of a host machine on which the system and method for testing a software emulator may be executed.

The objects of this invention may be accomplished utilizing components known in the art. Furthermore, the objects of the present invention may be accomplished by the operation of computerized system components implementable in hardware or software or in combination. Accordingly, a computer readable medium storing a program or containing instructions for realizing the objects of the present invention may be produced and is disclosed. Likewise, a processor with a memory containing instructions for realizing the objects of the present invention may be produced and is disclosed. Consequently, FIG. 5 illustrates host machine 90, as described above, comprising a CPU or processor 92, a memory 94, a secondary storage 96, and an output device 98. As stated, the memory 94 (e.g., RAM) and/or secondary storage 96 (e.g., a hard-drive, CDROM, carrier wave) may be computer readable mediums and may store programs or contain instructions, executed by the CPU 92, for performing the above-described methods and functions. For example, the secondary storage 96 or the memory 94 may store the test program 36, main program 34 and emulator 32 described above. The output device 98 (e.g., a display, printer, speaker) may display or otherwise output the output of the test program 36.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A method for testing a software emulator while executing the software emulator on a target machine architecture, comprising the steps of:
   executing a test program on a target machine architecture, whereby a test program produces a first output;
   executing an emulator on the target machine architecture; and the emulator executing the test program under emulation, whereby the test program produces a second output.

2. The method of claim 1, further comprising the step of: calling a test program, whereby calling the test program triggers the executing the test program step.

3. The method of claim 1, further comprising the step of: calling an emulator, whereby calling the emulator triggers the executing the emulator step.

4. The method of claim 1, further comprising the step of: comparing the first output and the second output.

5. The method of claim 1, further comprising the step of: determining if the first output and the second output are within a certain margin of variation of each other.

6. The method of claim 1, wherein the main program includes an instruction that calls the test program whereby executing the test program step is triggered by the main program executing the test program call instruction.

7. The method of claim 1, wherein the emulator includes a state vector.

8. The method of claim 1, wherein executing the emulator comprises:
   calculating a target machine state at a point of return;
   saving the target machine state in a state vector;
   allocating additional resources to execute the emulator; and
   reading a next instruction according to the state vector.

9. A computer readable medium comprising instructions for testing a software emulator while executing the software emulator on a target machine architecture, by:

executing a test program on a target machine architecture, whereby the test program produces a first output;

executing an emulator on the target machine architecture; and the emulator executing the test program under emulation, whereby the test program produces a second output.

10. The computer readable medium of claim 9, further comprising instructions for:

calling the test program, whereby the calling triggers the executing of the test program step.

11. The computer readable medium of claim 9, further comprising instructions for:

calling the emulator, whereby calling the emulator triggers the executing emulator step.

12. The computer readable medium of claim 9, further comprising instructions for:

comparing the first output and the second output.

13. The computer readable medium of claim 9, further comprising instructions for:

determining if the first output and the second output are within a certain margin of variation of each other.

14. The computer readable medium of claim 9 wherein the emulator includes a state vector.

15. The computer readable medium of claim 9, further comprising instructions for:

calculating a state of target machine at a point of return;

saving the target machine's state in a state vector;

allocating additional resources of the target machine to execute the emulator; and reading a next instruction according to the state vector.

16. A computer readable medium containing a program that includes instructions for testing a software emulator while executing the software emulator on a target machine architecture, by:

executing a test program on a target machine architecture, whereby the test program produces a first output; and executing an emulator on target machine architecture, whereby the emulator:

calls the test program, and executes the test program under emulation, whereby the test program produces a second output.

17. The computer readable medium of claim 16 wherein the main program further comprises instructions for:

calling the test program.

18. The computer readable medium of claim 16, wherein the main program further comprises instructions for:

calling the emulator, wherein calling the emulator triggers executing of the emulator.

19. The computer readable medium of claim 16, wherein the main program further comprises instructions for:

comparing the first output and the second output.

20. The computer readable medium of claim 16, wherein the main program further comprises instructions for:

determining if the first output and the second output are within a certain margin of variation of each other.

\* \* \* \* \*